May 12, 1953     R. ROBICHAUX     2,638,419
HYDROGEN ION CONCENTRATION ADJUSTMENT
Filed Feb. 10, 1949
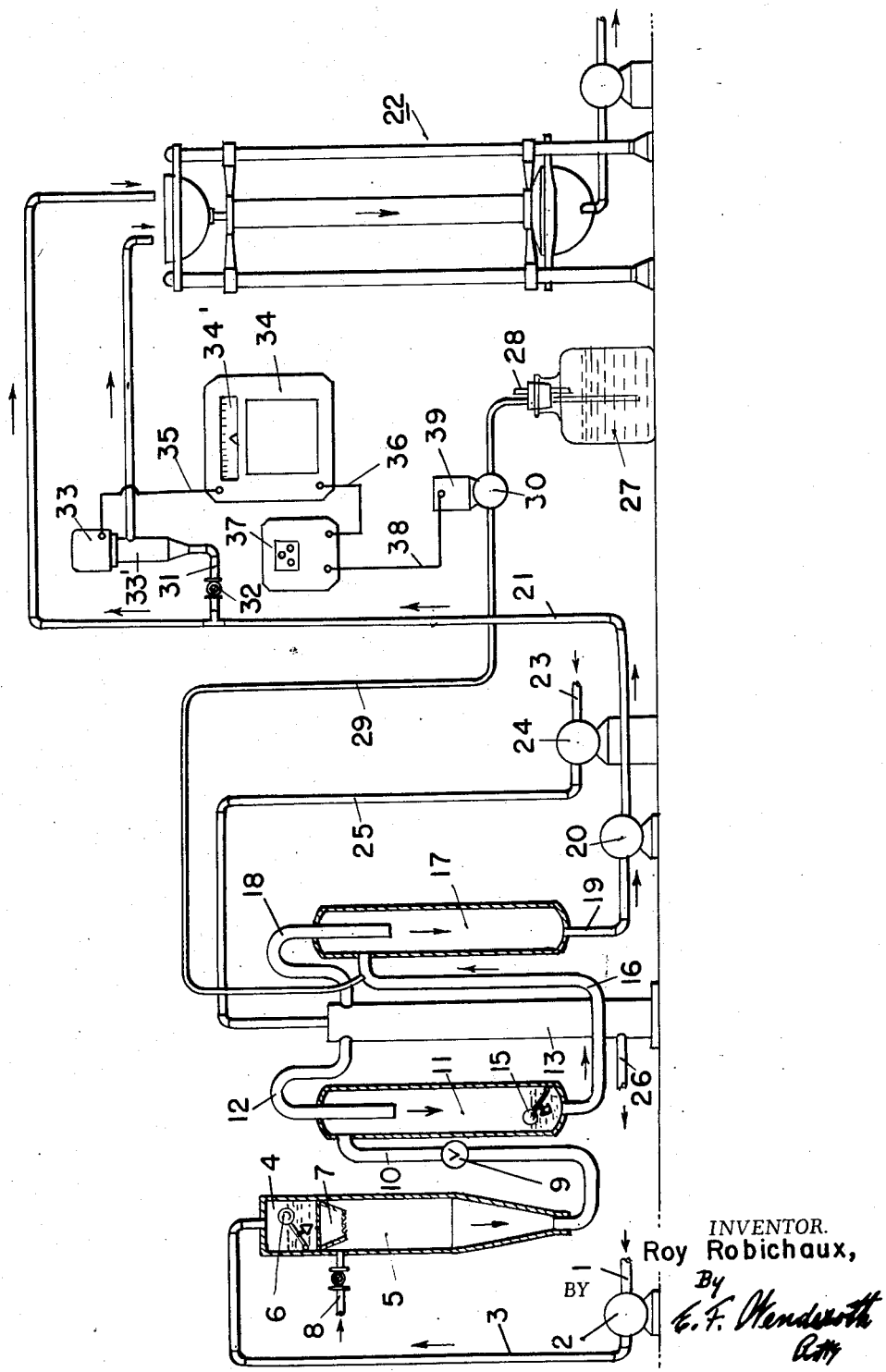
INVENTOR.
Roy Robichaux, Patented May 12, 1953

2,638,419

UNITED STATES PATENT OFFICE 2,638,419

HYDROGEN ION CONCENTRATION ADJUSTMENT

Roy Robichaux, Brodhead, Wis.

Application February 10, 1949, Serial No. 75,643

24 Claims. (Cl. 99—60)

This invention relates to a method and apparatus for the continuous adjustment of the hydrogen-ion concentration, or pH, of liquids intended for human consumption such as, for example, whole milk, skim-milk, butter-milk, whey, ice-cream mix, cream, and cream concentrate. Since a very important aspect of the invention is its application to the processing of milk and milk products, primary emphasis is hereinafter laid on this aspect. It is to be understood, however, that the reference to the processing of milk and milk products is intended to be wholly illustrative and that the invention is not to be interpreted as being limited to the treatment of milk and the like.

More specifically, this invention relates to improvements in method and apparatus for the continuous addition of pH correction media to the edible liquid, being processed, while under reduced pressure or vacuum.

Still more specifically, this invention, when applied to the processing of milk, cream and other milk products, or mixture containing milk or milk products, such as ice-cream mix, contemplates, substantially but not exclusively, the subsequent conversion of the milk, cream, skim-milk, butter-milk, whey, or mix, into any of the many products that are manufactured from milk or in part therefrom.

In connection with the heat treatment and vacuum processing of milk, or any of its derivatives, it generally becomes necessary and is beneficial to reduce the acid by addition of a suitable acid neutralizing medium. Under some circumstances, however, it is desirable to increase the acid content of the product, being processed, by the addition of a suitable acid solution. Yet again in some phases of processing edible liquids the adjustment of alkalinity is necessary.

As heretofore practiced in the art such neutralizing media were added to batches of the lacteal liquid or ice-cream mix either before and/or after processing. Furthermore, it has been general practice to reduce the acid content of such liquids, by such method, to a relative acid number or percentage.

There is an important difference between pH and titratable acidity or alkalinity. pH is a measure of the intensity of the acid or alkali, whereas titratable acidity or alkalinity is a measure of the amount of acid or alkali present. In order to obtain a comprehensive view of the properties of a solution both systems should be used because different acids or alkalies have different activities when present in equal amounts.

However, in my new method of continuous adjustment of the acid or alkali content of edible liquids, while flowing through vacuum equipment, a given pH value is aimed at, rather than a titratable amount of acidity or alkalinity, as being the more valuable as to final results.

The pre-addition of the whole or some portion of the acid reducing medium is necessary with certain non-vacuum types and combinations of heat treating equipment, in order to avoid coagulation of certain milk solids, but the addition of acid reducing media before heat treatment has, nevertheless, certain objectionable features in the processing of some products. Some types of heating, or pasteurizing, or sterilizing equipment make necessary the addition of the whole of the acid neutralizing medium before treatment, while with other types of equipment it is possible, when desired, to only add a part of the neutralizing medium before treatment and the balance after the heat treatment. With yet other types of heating apparatus it is possible to process the product entirely before the neutralizing medium is added to the batch.

The earlier practice of reducing milk acidity with acid neutralizing media, either before or after or partly before and partly after pasteurization and processing, had certain disadvantages. Some typical examples of these disadvantages are as follows: (1) The addition of the acid reducing medium to some products before vacuum treatment causes foaming of the liquid product with, at times, some loss of same into the condensing system. (2) The addition of the total acid reducing medium to churning cream, before pasteurization treatment, results in an increase of the fat-loss in the butter-milk. (3) The addition of the acid reducing medium to the product subsequently to processing does, under some circumstances, result in impaired flavor of the finished product.

The old conventional practice of reducing milk acidity to an acid number or percentage necessitated the sampling and testing of each batch of product in order to ascertain the percentage or amount of acid present. By subsequent calculation, and weighing or measuring of the acid reducing medium to be used, an attempt was made to standardize the acidity to a pre-determined point. All of the steps were directly subject to human error. In order to come anywhere near the acid number or percentage aimed at, by the conventional practice, it was necessary to carry out the following steps precisely: (1) weigh and boil the sample of product for the acid test; (2)

make use of the correct strength of alkali solution for the acid test; (3) have the product in a homogeneous condition when sampling for the acid test and when adding the neutralizing solution; (4) heat-temper cold and thick cream before taking the sample for the acid test; (5) accurately determine the pounds of product in the batch to be neutralized; (6) carefully calculate the amount of neutralizer; (7) correctly weigh the required amount of neutralizer on a sensitive accurate scale; (8) spray the well diluted neutralizing solution into the product while under good agitation; (9) neutralize high acid cream and partially-sweet cream separately before mixing the two together; (10) re-check the batch of neutralized product after processing or pasteurizing to determine the degree or percentage of acidity obtained; (11) complete the test, after processing or pasteurizing, by using the same procedure as above, thus entailing further calculations and, generally, re-neutralizing to arrive at an approximate degree of accuracy.

Rarely was it possible, with any consistent degree of certainty, to reach the end point in the finished product where the hydrogen-ion concentration would be that at which one aimed.

Another disadvantage of the prior art practice, in the manufacture of many products, was the necessity for delaying the commencement of heat treatment and vacuum processing until a batch of the product, to be processed, had accumulated, been tested, and the acid reducing medium added. During processing, therefore, it became necessary to work from batch to batch if more than one batch of product was to be processed. Sampling, testing, and adding acid reducing media to a series of batches generally resulted in considerable fluctuation in the hydrogen-ion concentration of the individual batches in the series.

The addition of acid reducing medium to a batch of product introduced the risk of local over-neutralization before a thorough mixing of medium and product has been accomplished. This often resulted in saponification of a portion of the fat and the development of a chemical or "neutralizer" flavor in the finished product.

Where the acid reducing medium was added after processing, either in whole or even in part, the products of "neutralization" remained in the liquid, being processed unless subjected to further treatment in vacuum.

The addition of acid reducing media to any milk, or milk product, that was to be condensed, or that was in process of being condensed, or after condensing was completed, was subject to many of these errors and was attended by most of the disadvantages hereinbefore described.

The control of the pH value of milk products is a most important step in the standardization and improvement of these products. For example, it is most important to control the pH of the butter serum at a pH of 6.9 to 7.1 for butter which is to be successfully stored for any period of time, and at a pH of 6.5 to 7.0 for butter which is not to be stored. This control gives a combination of ideal flavor and keeping quality in the finished product.

In my new and original method of continuously adding the acid reducing media to milk, milk products, or ice-cream mix, while flowing through vacuum apparatus, in such a manner as to maintain the product, being processed, substantially, at a given pH value, the numerous disadvantages associated with the older conventional method of "neutralizing" to an acid number or percentage are entirely eliminated and the desired hydrogen-ion concentration of the final product is assured.

Substantially then, the application of my new method of "neutralizing" to milk, milk derivatives, and mixes containing milk or milk products, makes the use of the batch system of procedure unnecessary. It avoids the inconvenience and cost of sampling each batch and testing for acidity. It eliminates calculations and the labor of preparing and adding the acid reducing medium manually. It prevents local over-neutralization and the risk of fat saponification and the danger of having "neutralizer" flavor in the finished product. There being no integrated gas formation there is no foaming or entrainment loss from this cause in vacuum equipment. It permits a constant and progressive acid reduction of the product during condensing operations. It assures the final product having the desired hydrogen-ion concentration.

The continuous and regulated addition of the acid reducing medium to the product, during ebullition in vacuum, produces immediate and thorough mixing and instant release of the gases formed by the reaction of the neutralizing medium with the acid content of the product. Complete reaction and total conversion of the acid reducing medium is also assured.

My method can be applied to any combined heating and vacuum processing equipment used in the treatment of milk, milk products, ice-cream mix, etc. Any of the recording or indicating pH meters or potentiometers available on the market can be used with a hand operated valve means or with a proportioning valve automatically controlled by pH recorder-controller means.

The objectives of my present invention are, therefore, to provide a method for the control and adjustment of the hydrogen-ion or pH concentration of liquids intended for human consumption, while flowing continuously through vacuum equipment and especially fluids such as whole milk, skim milk, butter-milk, whey, ice cream mix, cream, cream concentrate, milk fat or butter oil etc., in which process the pH adjusting medium is continuously drawn in the equipment at a suitable point, by the effect of the vacuum obtaining therein, through a pipe connected to said vacuum equipment and to a vessel containing the pH adjusting medium, there being located in said pipe a regulating valve which may be controlled either by hand or by automatic means; wherein the liquid being procesesd is being adjusted continuously to a desired pH value; wherein the coagulation of the milk solids in milk or its derivatives or of solids in any edible liquid is prevented; wherein the addition of pH adjusting media either before and/or after processing is avoided; wherein induced foaming of the edible liquid being processed and entrainment loss does not occur; wherein the gases produced by chemical reaction are removed from the product; wherein the loss of fat from cream being churned into butter is greatly reduced; wherein impairment of flavor of the product through chemical reaction of pH correction media with certain constituents of the product is absent; wherein objectionable flavor development in products, due to improper pH correction when the titratable acid or alkaline figure is used, is obviated; wherein the many steps and labor involved in the use of the titratable acid or alkaline figure is entirely eliminated; wherein the necessity to delay processing operations until a batch of product has accumulated is non-existent; wherein the variation in the pH value of different batches does not happen; wherein the progressive increase in acidity occurring in milk products during a condensing operation, may be continuously held down to a constant pH value; wherein total and complete reaction of the pH adjusting media is assured.

The foregoing objects and other important features of my present invention will become more apparent upon a review of the following specifications and claims, which, for the purpose of clarity, but without limitation, of the invention, make reference to the accompanying drawing, which is a diagrammatic representation of one combination of apparatus with which my method, for the continuous adjustment of the hydrogen-ion concentration, or pH, of liquids, intended for human consumption, while being processed under reduced pressure or vacuum, can be suitably applied.

In this drawing a conduit 1 serves to supply liquid product, to be treated, from any suitable source of supply (not shown). The said liquid product may, solely for the purposes of illustration, be assumed to be milk. Conduit 1 communicates with the pump 2 for feeding the liquid received from conduit 1 through connecting pipe 3 to the receiving chamber 4 positioned above the vacuum compartment of the vacuum chamber 5. In some applications a preheating device might be positioned between the connecting pipe 3 and the receiving chamber 4. From the receiving chamber 4 the liquid drains through an aperture controlled by float valve 6 into a distributing head 7 positioned in the upper portion of the vacuum chamber 5. From the distributing head 7, the liquid flows through the vacuum chamber 5, finely dispersed substantially throughout the cross section of the said chamber 5. In the latter, the finely dispersed liquid is intimately and gently mixed with steam, introduced into the upper portion of the chamber 5 through the steam supply conduit 8. A suitable and convenient manner of securing the gentle mixing of the steam and liquid, being processed, is that illustrated for example in the Murray Patents No. 2,091,606 and No. 2,325,534. The mixture of the steam and finely dispersed particles or droplets of liquid in the chamber 5 substantially instantaneously raises the temperature of the particles of liquid to the steam temperature which corresponds to the degree of vacuum or sub-atmospheric pressure existing within the vacuum chamber 5.

The degree of vacuum or sub-atmospheric pressure existing within the vacuum chamber 5 is controlled by the valve 9 positioned within the conduit 10, which connects the first vacuum chamber 5 with the second vacuum chamber 11. The vacuum chamber 11 is partially exhausted through a conduit 12 communicating at one end with the upper portion of the chamber 11 and communicating at its opposite end with the ejector-condenser 13. The latter may be of known construction and provides a means for establishing and maintaining the desired vacuum in the apparatus. The difference in pressure between the first vacuum chamber 5 and the second vacuum chamber 11 causes the intermingled steam and liquid, that is, the heated fluids, to flow from the lower portion of the chamber 5 through the conduit 10 into the upper portion of the second vacuum chamber 11. The difference in pressure between the chambers 5 and 11 is controlled by the appropriate adjustment of the valve 9, whereby the flow of liquids or gases through the conduit 10 from the chamber 5 to the chamber 11 may be regulated.

Any suitable and conventional means (not shown) may be employed for effecting the desired adjustment of the pressure-reducing valve 9. This arrangement is per se conventional.

The heated mixture of liquid and gases discharged from the conduit 10 enters the steam distillation chamber 11 tangentially near the upper portion thereof, whereby the liquid, thus introduced into the chamber 11, is caused to swirl downwardly over the inner surface of the wall of the chamber 11, producing thereby a cyclonic action, tending to separate gases from liquids, thereby permitting the withdrawing of gases and other free volatile matters from the central portion of the chamber 11 through the exhaust conduit 12.

The heated mixture of liquid and remaining entrained gases, after passing downwardly over the inner wall of the chamber 11, accumulates in the lower portion thereof and from thence passes through an aperture controlled by a float valve 15 into a conduit 16 from which it is tangentially discharged into the upper portion of a third vacuum or cooling chamber 17.

The vacuum chamber 17 is provided with an exhaust conduit 18, which, like exhaust conduit 12, for chamber 11, is connected at one end with the upper portion of the chamber 17 and at its opposite end is connected with the ejector condenser 13. As aforesaid, by means of such a suitable source of vacuum, desired degrees of vacuum may be secured and maintained within the chamber 17. The ejector condenser 13 may preferably be that fully illustrated and described in the Murray Patent No. 2,378,425, i. e. it may be of the compound condenser type so that the vacuum chamber 11 may be subjected to vacuum from one portion of the condenser while the vacuum chamber 17 may be subjected to a different degree of vacuum from another portion of the condenser.

The liquid, which has entered the upper portion of chamber 17 from the conduit 16, swirls downwardly over the inner face of the wall of the chamber 17, bringing about a cyclonic separation of the entrained gases remaining in the liquid and cooling the liquid by evaporation of a portion thereof. The separated entrained gases and evaporated liquid are forced by cyclonic separation action toward the inner portion of the chamber 17, from whence they are withdrawn through the exhaust conduit 18. The liquid which is swirled downwardly over the inner wall of the chamber 17 accumulates in the lower portion thereof and is withdrawn therefrom through conduit 19 by means of pump 20, which in turn forces the liquid through a discharge conduit 21 to the conventionally constructed surface cooler assembly 22 or to some other preferred station.

To cause the liquid to flow from the chamber 11 through the float valve 15 and thence into and through the conduit 16 into the third vacuum or cooling chamber 17, it is necessary to maintain a greater degree of vacuum in the chamber 17 than is maintained in the second or steam distillation vacuum chamber 11.

A conduit 23 serves to supply water, from any suitable source of supply (not shown). Conduit 23 communicates with pump 24 for forcing the water received from conduit 23 through connecting pipe 25 to the top of the ejector condenser 13. The effluent, water and gases, escapes from the lower end of the ejector condenser by way of the conduit 26 and is conveyed thereby to some suitable station. The function of the ejector-condenser 13 is to condense the water vapor and entrain the gases coming over from the vacuum chambers 11 and 17, by way of conduits 12 and 18, and thereby to maintain the desired degrees of vacuum in vacuum chambers 5, 11 and 17. To this end, the ejector condenser 13 may, as aforesaid, be of the compound condenser type disclosed in the Murray Patent No. 2,378,425.

A vessel 27, having an air vent 28, serves to contain a pH adjusting solution, for example an aqueous caustic soda solution. A pipe 29, having one end immersed in the solution contained in the vessel 27, is connected to the upper or discharge end of conduit 16 at a point close to its tangential connection to the vacuum chamber 17. Inserted at a convenient point on pipe 29 is a regulating valve 30. By operating the valve 30, either by hand or by automatic means, a regulated amount of the pH adjusting solution is allowed to flow through pipe 29 and to be discharged into and to be immediately and intimately intermingled with the liquid product which is flowing from the vacuum chamber 11 by way of the conduit 16 into the upper region of vacuum chamber 17. It is evident that the vacuum in the vacuum chamber causes a pressure differential which results in the flow of the solution through pipe 29.

At a suitable point on the product discharge conduit 21 there is located a by-pass pipe 31 which conveys a regulated amount of the processed liquid product to the surface cooler 22. On by-pass pipe 31 is inserted a regulating valve means 32 by which is regulated the desired flow of the treated product. Along the by-pass pipe 31, between regulating valve 32 and the surface cooler 22 there is located the thermometer and electrode assembly 33 of the pH meter or potentiometer 34.

These parts are per se essentially conventional in construction. The thermometer-electrode assembly which, in effect, is a control unit may, for example, consist of a sensitive measuring electrode, a reference electrode, and a temperature compensator. The assembly 33 is mounted as a unit, with the sensitive ends of the electrodes and compensator in a flow chamber 33' through which there continuously moves the sample of processed liquid product which is taken off through by-pass 31. As pH of the product varies, the electromotive force set up by the immersed electrodes varies correspondingly.

The thermometer-electrode assembly 33 is connected to the potentiometer 34 by electrical conductor 35. In the potentiometer circuit of member 34, the electrode E. M. F. is balanced against the adjustable voltage of the instrument slidewire. Because the adjustable voltage is modified by the action of the temperature compensator, the balancing operation is influenced both by pH change and by temperature change, so that the resulting value is in terms of actual pH at the operating temperature. This value may be indicated and, if desired, recorded in conventional manner on the scale 34'.

Should automatic control of the regulating value 30 be desired, the controller 37, which may be set to correspond to any pH and which is electrically connected to potentiometer 34 by wire 36, is brought into play. The controller 37 is electrically connected to motor 39 by wire 38, motor 39 being provided with suitable conventional mechanism whereby it is connected to regulating valve 30.

When the pH of the processed liquid deviates from the control value, the resultant change in pH is detected and the valve 30 is automatically actuated to counterbalance the deviation.

In so far as conventional parts and devices are hereinbefore described, it will be understood that this is done in an illustrative sense and that use may just as well be made of other equivalent known devices.

It follows from the foregoing disclosure of the principles of this invention and of a preferred illustrative embodiment thereof that the invention realizes the introductorily enumerated objectives by providing a new process and apparatus for the control and adjustment of the pH of edible liquids which are being processed under reduced pressure by automatically incorporating pH-correcting medium into such liquids while under such reduced pressure, whenever the pH-value deviates from an established magnitude.

Having thus disclosed the invention and a presently-preferred embodiment thereof, what is claimed is:

1. A method for treating a continuously flowing stream of lacteal fluid to control and adjust the pH value thereof to a predetermined desired magnitude comprising, continuously flowing a stream of lacteal fluid into, through and discharging the stream from a zone of sub-atmospheric pressure wherein the stream of fluid is subjected to a pH value adjustment reaction, continuously determining the pH value of the stream of lacteal fluid discharged from said zone of sub-atmospheric pressure, automatically and continuously drawing the pH adjustment medium into said stream of lacteal fluid by the action of said sub-atmospheric pressure in proportion to the deviation from an established magnitude of the pH value of the stream of lacteal fluid discharged from said zone of sub-atmospheric pressure, continuously intermingling the flowing stream of lacteal fluid with the pH adjustment medium drawn into said stream, subjecting the intermingled mixture of lacteal fluid and pH adjustment medium to the effects of sub-atmospheric pressure while continuing the intermingling action until the ion concentration adjustment is substantially completed, and continuously withdrawing the treated stream of lacteal fluid from the zone of sub-atmospheric pressure.

2. A method for treating material consisting of liquids intended for human consumption to control and adjust the hydrogen ion concentration thereof to a predetermined desired magnitude comprising, intermingling the material being treated with hydrogen ion concentration adjustment media introduced into the material being treated, subjecting the intermingled material and media to the effects of sub-atmospheric pressure while continuing the intermingling action and concurrently withdrawing products of reaction produced by the intermingling of the hydrogen ion concentration adjustment media and the material being treated until said reaction is substantially completed, releasing the treated material from the effects of sub-atmospheric pressure, continuously determining the hydrogen ion concentration of the released treated material, and automatically controlling the introduction of the hydrogen ion adjustment media into the material being treated in proportion to the deviation from an established magnitude of the hydrogen ion concentration of the treated material released from the effects of said sub-atmospheric pressure.

3. A method according to claim 2, wherein said reaction is commenced and completed substantially instantaneously after the intermingling of the ion concentration adjustment media with the material being treated.

4. The combination, comprising, a sub-atmospheric pressure reaction chamber, exhausting means for applying and maintaining a sub-atmospheric pressure condition in said chamber, conduit means for introducing material to be subjected to sub-atmospheric pressure into said chamber, conduit means including valve means for introducing material adjustment media into said chamber to be blended therein with the material being subjected to sub-atmospheric pressure, conduit means for withdrawing treated material from said chamber, sampling means for continuously sampling and testing means for testing certain characteristics of sampled fractions of the material discharged from said chamber, actuating means responsive to said testing means for actuating said valve means whereby to control the introduction of material adjustment media into said chamber, said conduit means including valve means for introducing material adjustment media being so constructed and arranged that the sub-atmospheric pressure conditions existing in said reaction chamber will be effective to cause the flow of the material adjustment media into said reaction chamber from said conduit means including valve means.

5. A continuous method for treating liquids intended for human consumption, comprising, continuously diffusing or intermingling together a flowing stream of liquid to be standardized and a pH adjustment medium which reacts with the liquid to produce gas while the intermingled liquid and medium are passing through a confining container which is under the influence of a predetermined and maintained degree of vacuum thereby to cause a substantially instantaneous completion of the reaction between said liquid and said medium, and separating substantially all of the thus produced gas from the liquid prior to the removal of the liquid from the partially evacuated confining container.

6. The method of applying an agent to a stream of flowable edible liquid to effect the pH condition thereof which comprises, flowing the material at a constant rate throughout a sub-atmospheric pressure chamber wherein a predetermined sub-atmospheric pressure is established and maintained, continually introducing a pH controlling agent into and intermingling it with the flowing material before it leaves said chamber, withdrawing from said chamber the mixture of said intermingling and substantially reacted material and controlling agent, determining the pH of said mixture, and controlling the rate of introduction of said pH controlling agent in accordance with the variations in the determined pH of said mixture.

7. Apparatus for treating material to adjust the hydrogen ion concentration thereof comprising, in combination, a partially evacuated mixing chamber maintained under reduced pressure, pressure reducing means for maintaining a determined degree of reduced pressure in said chamber, inlet means for introducing material being treated into said partially evacuated mixing chamber, material discharge means for discharging the reduced pressure treated material from said partially evacuated mixing chamber, hydrogen ion concentration determining means for determining the hydrogen ion concentration of the material discharged from said chamber, and regulatable material introducing means responsive to said hydrogen ion concentration determining means for introducing hydrogen ion adjustment material in regulatable quantities into the material being treated prior to the discharge of the material from said chamber.

8. Apparatus for treating material to adjust the hydrogen ion concentration thereof comprising, in combination, a partially evacuated mixing chamber maintained under reduced pressure, pressure reducing means for maintaining a determined degree of reduced pressure in said chamber, inlet means for introducing material being treated into said partially evacuated mixing chamber, material discharge means for discharging the reduced pressure treated material from said partially evacuated mixing chamber, electric cell type hydrogen ion concentration determining means for determining the hydrogen ion concentration of the material discharged from said chamber, and regulatable material introducing means responsive to said hydrogen ion concentration determining means for introducing hydrogen ion adjustment material in regulatable quantities into the material being treated while said material is passing through said inlet means.

9. Apparatus for treating material to adjust the hydrogen ion concentration thereof comprising, in combination, a partially evacuated mixing chamber maintained under reduced pressure, pressure reducing means for maintaining a determined degree of reduced pressure in said chamber, inlet means for introducing material being treated into said partially evacuated mixing chamber, material discharge means for discharging the reduced pressure treated material from said partially evacuated mixing chamber, electric cell type hydrogen ion concentration determining means for determining the hydrogen ion concentration of the material discharged from said chamber, and regulatable material introducing means responsive to said hydrogen ion concentration determining means for introducing hydrogen ion adjustment material in regulatable quantities into the material being treated while said material is passing through said inlet means, said regulatable means for introducing hydrogen ion adjustment material being so constructed and arranged that the reduced pressure condition existing in said chamber will be effective to cause the flow of hydrogen ion adjustment material into said inlet means from said regulatable means for introducing hydrogen ion adjustment material.

10. Apparatus for the continuous treatment of material to adjust the hydrogen ion concentration thereof comprising, in combination, a partially evacuated mixing chamber maintained under reduced pressure, pressure reducing means for maintaining a determined degree of sub-atmospheric pressure in said chamber, metering type material inlet means for continuously introducing into said chamber metered quantities of material to be treated, metering type material discharge means for continuously discharging from said chamber metered quantities of material which has been subjected to the effects of sub-atmospheric pressure, hydrogen ion concentration determining means for continuously receiving material discharged from said discharge means and continuously and automatically determining the hydrogen ion concentration thereof, and regulatable automatic material introducing means responsive to said hydrogen ion concentration determining means for continuously introducing regulatable quantities of hydrogen ion concentration adjustment material into the material being treated prior to the discharge of the material from said chamber.

11. In combination, a partially evacuated mixing chamber maintained under reduced pressure, pressure reducing means for maintaining a determined degree of reduced pressure in said chamber, inlet means for introducing material being treated into said partially evacuated mixing chamber, material discharge means for discharging the reduced pressure treated material from said partially evacuated mixing chamber, ion concentration determining means for determining the ion concentration of the material discharged from said chamber, and regulatable material introducing means responsive to said ion concentration determining means for introducing ion adjustment material in regulatable quantities into the material being treated prior to the discharge of the material from said chamber.

12. A continuous method for treating flowable ebullient material having a hydrogen ion concentration value of a magnitude different than a desired magnitude to adjust the hydrogen ion concentration value thereof to a pre-determined uniform desired magnitude which comprises, continuously and automatically introducing liquid hydrogen ion adjustment medium at a controllable rate into a continuously flowing constant rate stream of said material to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing any gases released from the mixture while being thus subjected to sub-atmospheric pressure, continuously discharging the stream of reacted mixture from said reaction zone, continuously determining the hydrogen ion concentration value of the mixture after discharge thereof from said reaction zone, and automatically controlling the rate of introduction of said medium into said material in proportion to the deviation from said pre-determined desired magnitude of the hydrogen ion concentration value of the said discharged mixture, whereby to adjust the hydrogen ion concentration value of said material to a uniform pre-determined magnitude.

13. Apparatus for continuously treating flowable ebullient material having a hydrogen ion concentration value of a magnitude different than a desired magnitude to adjust the hydrogen ion concentration value thereof to a pre-determined uniform desired magnitude comprising, in combination, a vertical cylindrical reaction chamber, flow passage material supply means for continuously introducing a constant rate stream of said material tangentially into the upper portion of the said reaction chamber whereby to swirl said material downwardly within said chamber, controllable medium supply means for continuously introducing hydrogen ion concentration adjustment medium at a controllable rate into said material prior to the discharge of the material from said reaction chamber, ejector condenser type pressure reducing means for establishing and maintaining a pre-determined sub-atmospheric pressure condition within said chamber whereby to withdrawn gases released within said chamber and to produce such ebullition in the mixture of said material and said medium as to thoroughly intermingle and substantially instantaneously react said material and said medium, pump type discharge means for continuously discharging the reacted material from the lower portion of said chamber, sampling means for sampling the discharged reacted material, electrical cell type testing means for continuously and automatically determining the hydrogen ion concentration value of the sampled fraction of said discharged reacted material, and automatic control means responsive to said testing means for continuously controlling the introduction of said medium into said chamber in proportion to the deviation from a pre-determined desired magnitude of the hydrogen ion concentration value of the reacted material as determined by said testing means, said means through which said medium is supplied being so constructed and arranged that the sub-atmospheric pressure condition existing in said chamber will be effective to cause the introduction of said material.

14. A continuous method for treating acidified cream to substantially neutralize the acid content thereof and adjust the pH value thereof from a pH value of less than 7 to a pH value of approximately 7 which comprises, continuously and automatically introducing aqueous caustic soda solution at a controllable rate into a continuously flowing constant rate stream of acidified cream to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing any gases released from the mixture while being thus subjected to atmospheric pressure, continuously discharging the reacted mixture from said reaction zone, continuously determining the pH value of the mixture after discharge thereof from said reaction zone, and automatically controlling the rate of introduction of said aqueous caustic soda solution into said acidified cream in proportion to the deviation of the pH value of the discharged reacted mixture below a pH value of approximately 7 whereby to raise the pH value of the acidified cream to a pH value of approximately 7.

15. A method for treating flowable ebullient material having a hydrogen ion concentration value of a magnitude different than a desired magnitude to adjust the hydrogen ion concentration value thereof to a pre-determined desired magnitude which comprises, introducing hydrogen ion adjustment medium into said material to form a mixture, introducing said mixture into a reaction zone, subjecting the mixture while in said zone to the effects of sub-atmospheric pressure of an intensity sufficient to produce ebullition in the mixture whereby to thoroughly intermingle and react the ingredients of the mixture one with another and for withdrawing the gases released from the mixture while being thus subjected to sub-atmospheric pressure, discharging the mixture from said reaction zone, determining the hydrogen ion concentration value of the mixture after discharge thereof from the reaction zone, and automatically controlling the introduction of said medium into said mixture in proportion to the deviation from said pre-determined desired magnitude of the hydrogen ion concentration value of the said discharged mixture whereby to adjust the hydrogen ion concentration value of said material to a pre-determined desired magnitude.

16. A continuous method for treating flowable ebullient material consisting of liquids intended for human consumption having a hydrogen ion concentration value of a magnitude less than a desired magnitude to raise the hydrogen ion concentration value thereof to a pre-determined uniform desired magnitude which comprises continuously and automatically introducing hydrogen ion adjustment medium at a controllable rate into a continuously flowing stream of said material to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing gases released from the mixture while being thus subjected to sub-atmospheric pressure, continuously discharging the stream of reacted mixture from said reaction zone, continuously determining the hydrogen ion concentration value of the mixture after discharge thereof from said reaction zone, and automatically controlling the rate of introduction of said medium into said mixture in proportion to the deviation from said pre-determined desired magnitude of the hydrogen ion concentration value of the said discharge mixture whereby to raise the hydrogen ion concentration value of said mixture to a uniform pre-determined magnitude.

17. A continuous method for treating flowable ebullient material consisting of lacteal liquids having a hydrogen ion concentration value of a magnitude less than a desired magnitude to raise the hydrogen ion concentration value thereof to a pre-determined uniform desired magnitude which comprises, continuously and automatically introducing hydrogen ion adjustment medium at a controllable rate into a continuously flowing stream of said material to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing gases released from the mixture while being thus subjected to sub-atmospheric pressure, continuously discharging the stream of reacted mixture from said reaction zone, continuously determining the hydrogen ion concentration value of the mixture after discharge thereof from said reaction zone, and automatically controlling the rate of introduction of said medium into said mixture in proportion to the deviation from said pre-determined desired magnitude of the hydrogen ion concentration value of the said discharge mixture whereby to raise the hydrogen ion concentration value of said mixture to a uniform pre-determined magnitude.

18. A continuous method for treating flowable ebullient material consisting of edible liquids having a hydrogen ion concentration value of a magnitude less than a desired magnitude to raise the hydrogen ion concentration value thereof to a pre-determined uniform desired magnitude which comprises, continuously and automatically introducing hydrogen ion adjustment medium at a controllable rate into a continuously flowing stream of said material to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing gases released from the mixture while being thus subjected to sub-atmospheric pressure, continuously discharging the stream of reacted mixture from said reaction zone, continuously determining the hydrogen ion concentration value of the mixture after discharge thereof from said reaction zone, and automatically controlling the rate of introduction of said medium into said mixture in proportion to the deviation from said pre-determined desired magnitude of the hydrogen ion concentration value of the said discharge mixture whereby to raise the hydrogen ion concentration value of said mixture to a uniform pre-determined magnitude.

19. A continuous method for treating flowable ebullient material consisting of a mix containing milk products having a hydrogen ion concentration value of a magnitude different than a desired magnitude to adjust the hydrogen ion concentration value thereof to a pre-determined uniform desired magnitude which comprises, continuously and automatically introducing hydrogen ion adjustment medium at a controllable rate into a continuously flowing stream of said material to form a mixture, continuously introducing said mixture into a reaction zone, subjecting the mixture while in said zone to the effects of sub-atmospheric pressure of an intensity sufficient to produce ebullition in the mixture whereby to thoroughly intermingle and substantially instantaneously completely react the ingredients of the mixture one with another and for withdrawing gases released from the mixture while being thus subjected to sub-atmospheric pressure, continuously discharging the stream of reacted mixture from said reaction zone, continuously determining the hydrogen ion concentration value of the mixture after discharge thereof from said reaction zone, and automatically controlling the rate of introduction of said medium into said material in proportion to the deviation from said pre-determined desired magnitude of the hydrogen ion concentration value of the said discharged mixture whereby to adjust the hydrogen ion concentration value of said mixture to a uniform pre-determined magnitude.

20. Apparatus for continuously treating flowable ebullient material to adjust the hydrogen ion concentration value thereof to a pre-determined desired magnitude comprising, in combination, a reaction chamber, supply means for continuously introducing a constant quantity stream of said material and a controllable quantity of hydrogen ion adjustment medium into said reaction chamber, pressure reducing means for establishing and maintaining a pre-determined sub-atmospheric pressure condition within said chamber whereby to withdraw gases released within said chamber and to produce such ebullition in the mixture of said material and said medium as to thoroughly intermingle and substantially instantaneously react said material and said medium, discharge means for discharging the reacted material from said chamber, testing means for determining the hydrogen ion concentration value of said reacted material, and control means responsive to said testing means for controlling the introduction of said medium into said chamber in proportion to the deviation from a pre-determined desired magnitude of the hydrogen ion concentration value of the reacted material as determined by said testing means.

21. Apparatus for continuously treating flowable ebullient material consisting of liquids intended for human consumption to adjust the hydrogen ion concentration value thereof to a pre-determined desired uniform magnitude comprising, in combination, a vertical reaction chamber, flow passage supply means for continuously introducing a constant quantity stream of said material and a controllable quantity of hydrogen ion concentration adjustment medium tangentially into the upper portion of said reaction chamber whereby to swirl said stream downwardly within said chamber, ejector condenser type pressure reducing means for establishing and maintaining a pre-determined sub-atmospheric pressure condition within said chamber whereby to withdraw gases released within said chamber and to produce such ebullition in the mixture of said material and said medium as to thoroughly intermingle and substantially instantaneously react said material and said medium, pump type discharge means for continuously discharging the reacted material from the lower portion of said chamber, sampling means for sampling and discharging reacted material, electrical cell type testing means for continuously and automatically determining the hydrogen ion concentration value of the sampled fraction of said reacted material, and automatic control means responsive to said testing means for continuously controlling the introduction of said medium into said chamber in proportion to the deviation from a pre-determined desired magnitude of the hydrogen ion concentration value of the reacted material as determined by said testing means.

22. Apparatus for continuously treating flowable ebullient material consisting of lacteal liquid to adjust the hydrogen ion concentration value thereof to a pre-determined desired uniform magnitude comprising, in combination, a vertical reacted chamber, flow passage supply means for continuously introducing a constant quantity stream of said material and a controllable quantity of hydrogen ion concentration adjustment medium tangentially into the upper portion of said reaction chamber whereby to swirl said stream downwardly within said chamber, ejector condenser type pressure reducing means for establishing and maintaining a pre-determined sub-atmospheric pressure condition within said chamber whereby to withdraw gases released within said chamber and to produce such ebullition in the mixture of said material and said medium as to thoroughly intermingle and substantially instantaneously react said material and said medium, pump type discharge means for continuously discharging the reacted material from the lower portion of said chamber, sampling means for sampling and discharging reacted material, electrical cell type testing means for continuously and automatically determining the hydrogen ion concentration value of the sampled fraction of said reacted material, and automatic control means responsive to said testing means for continuously controlling the introduction of said medium into said chamber in proportion to the deviation from a pre-determined desired magnitude of the hydrogen ion concentration value of the reacted material as determined by said testing means, said means through which said medium is supplied being so constructed and arranged that the sub-atmospheric pressure condition existing in said chamber will be effective to cause the introduction of said material.

23. Apparatus for continuously treating flowable ebullient material consisting of edible liquids to adjust the hydrogen ion concentration value thereof to a pre-determined desired magnitude comprising, in combination, a reaction chamber, flow passage material supply means for introducing said material into said reaction chamber, controllable medium supply means for introducing hydrogen ion concentration adjustment medium at a controllable rate into said material prior to the discharge of the material from said reaction chamber, pressure reducing means for establishing and maintaining a pre-determined sub-atmospheric pressure condition within said chamber whereby to withdraw gases released within said chamber and to produce such ebullition in the mixture of said material and said medium as to thoroughly intermingle and rapidly react said material and said medium, discharge means for continuously discharging the reacted mixture from said chamber, testing means for continuously and automatically determining the hydrogen ion concentration value of said reacted material, and automatic control means responsive to said testing means for continuously controlling the introduction of said medium into said chamber in proportion to the deviation from a pre-determined desired magnitude of the hydrogen ion concentration value of the reacted material as determined by said testing means.

24. Apparatus for continuously treating flowable ebullient material consisting of a mix containing milk products to adjust the hydrogen ion concentration value thereof to a pre-determined desired magnitude comprising, in combination, a vertical cylindrical reaction chamber, flow passage material supply means for continuously introducing a constant quantity stream of said material tangentially into the upper portion of said reaction chamber whereby to swirl said mixture downwardly within said chamber, controllable medium supply means for continuously introducing hydrogen ion concentration adjustment medium at a controllable rate into said mixture which is passed through said flow passage and prior to the discharge of the material from said reaction chamber, ejector condenser type pressure reducing means for establishing and maintaining a pre-determined sub-atmospheric pressure condition within said chamber whereby to withdraw gases released within said chamber and to produce ebullition in the mixture of said material and said medium as to thoroughly intermingle and substantially instantaneously react said material and said medium, pump type discharge means for continuously discharging the reacted material from the lower portion of said chamber, sampling means for sampling the discharged reacted material, electrical cell type testing means for continuously and automatically determining the hydrogen ion concentration value of the sampled fraction of said reacted material, and automatic control means responsive to said testing means for continuously controlling the introduction of said medium into said chamber in proportion to the deviation from a pre-determined desired magnitude of the hydrogen ion concentration value of the reacted material as determined by said testing means, said means through which said medium is supplied being so constructed and arranged that the sub-atmospheric pressure condition existing in said chamber will be effective to cause the introduction of said material.

ROY ROBICHAUX.

References Cited in the file of this patent

UNITED STATES PATENTS

| Number | Name | Date |
|---|---|---|
| 1,530,833 | Keeler | Mar. 24, 1925 |
| 1,759,996 | Parker | May 27, 1930 |
| 2,089,132 | Murray | Aug. 3, 1937 |
| 2,090,985 | Peebles et al. | Aug. 24, 1937 |

OTHER REFERENCES

Condensed Milk and Milk Powder, 6th ed., by O. H. Hunziker, pub. by author, La Grange, Illinois, 1946, pages 172 and 173.